United States Patent
Latuszek et al.

(10) Patent No.: US 8,490,374 B2
(45) Date of Patent: Jul. 23, 2013

(54) PIVOTING MOWER DECK

(75) Inventors: Scott R. Latuszek, Pittsboro, IN (US);
Scott A. Dufek, Pittsboro, IN (US);
Mark J. Kohrman, Greensburg, IN (US)

(73) Assignee: Wood-Mizer Products, Inc., Indianapolis, IN (US)

( * ) Notice: Subject to any disclaimer, the term of this patent is extended or adjusted under 35 U.S.C. 154(b) by 0 days.

(21) Appl. No.: 12/910,222

(22) Filed: Oct. 22, 2010

(65) Prior Publication Data
US 2011/0030327 A1 Feb. 10, 2011

Related U.S. Application Data

(63) Continuation of application No. 12/119,409, filed on May 12, 2008, now Pat. No. 7,841,157.

(51) Int. Cl.
*A01D 67/00* (2006.01)
*A01D 34/00* (2006.01)

(52) U.S. Cl.
USPC .......................................... 56/320.1; 56/16.3

(58) Field of Classification Search
USPC ................. 56/6, 13.5, 13.6, 15.2, 15.3, 15.9, 56/16.2, 16.3, 17.1, 228, 320.1, 320.2; 292/194, 292/203
See application file for complete search history.

(56) References Cited

U.S. PATENT DOCUMENTS

| | | | |
|---|---|---|---|
| 1,673,611 A | 6/1928 | Williams | |
| 3,339,353 A | 9/1967 | Schreyer | |
| 3,404,518 A | 10/1968 | Kasper | |
| 3,736,735 A | 6/1973 | Kulak et al. | |
| 4,116,282 A | 9/1978 | Hansen | |
| 4,429,515 A * | 2/1984 | Davis et al. | 56/6 |
| 4,442,658 A | 4/1984 | Cartner | |
| 4,660,654 A | 4/1987 | Wiebe et al. | |
| 4,854,112 A | 8/1989 | Holley et al. | |
| 5,177,942 A | 1/1993 | Hager et al. | |
| 5,233,817 A * | 8/1993 | Nicol | 56/6 |
| 5,321,938 A | 6/1994 | LeBlanc | |
| 5,483,787 A * | 1/1996 | Berrios | 56/10.1 |
| 5,740,870 A | 4/1998 | Rodgers et al. | |
| 5,771,669 A | 6/1998 | Langworthy et al. | |
| 6,065,274 A | 5/2000 | Laskowski et al. | |
| 6,308,503 B1 | 10/2001 | Scag et al. | |
| 6,494,026 B1 | 12/2002 | Schmidt | |
| 7,313,902 B1 | 1/2008 | Eavenson, Sr. et al. | |
| 7,438,137 B2 | 10/2008 | Pederson et al. | |
| 7,640,719 B2 * | 1/2010 | Boyko | 56/13.6 |
| 2003/0041580 A1 | 3/2003 | Ewanochko et al. | |

FOREIGN PATENT DOCUMENTS
EP 373406 6/1990

* cited by examiner

*Primary Examiner* — Thomas B Will
*Assistant Examiner* — Joan D Misa
(74) *Attorney, Agent, or Firm* — Barnes & Thornburg LLP

(57) ABSTRACT

A mower apparatus includes a mower deck having a first deck section, a second deck section pivotable relative to the first deck section, and a latch. The latch is actuable between a first position in which the latch maintains the second deck section in a lowered position and a second position in which the latch maintains the second deck in a raised position.

10 Claims, 13 Drawing Sheets

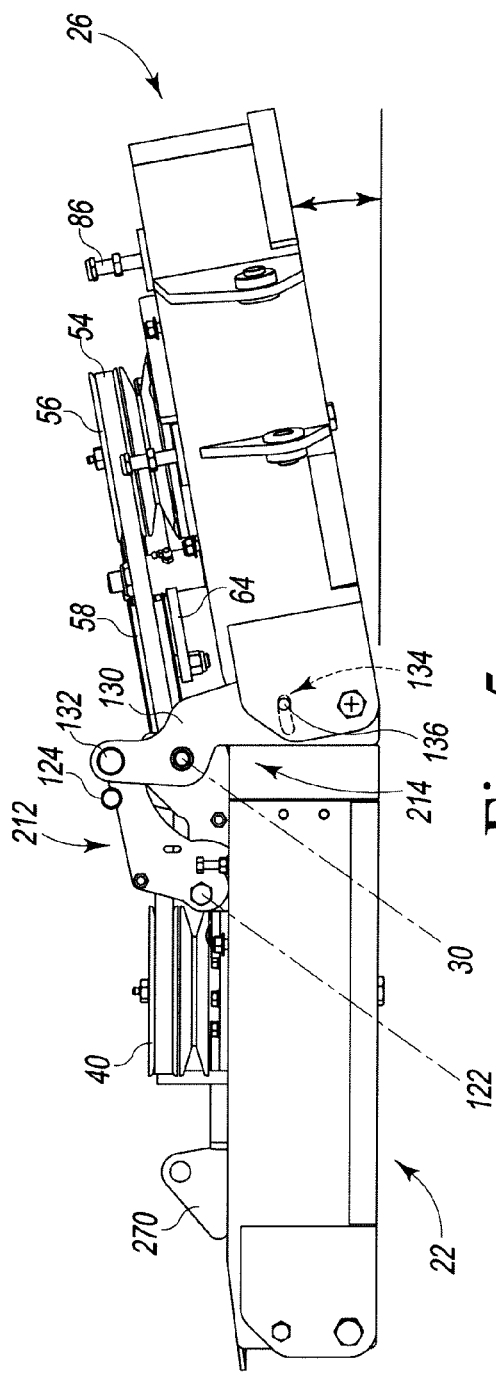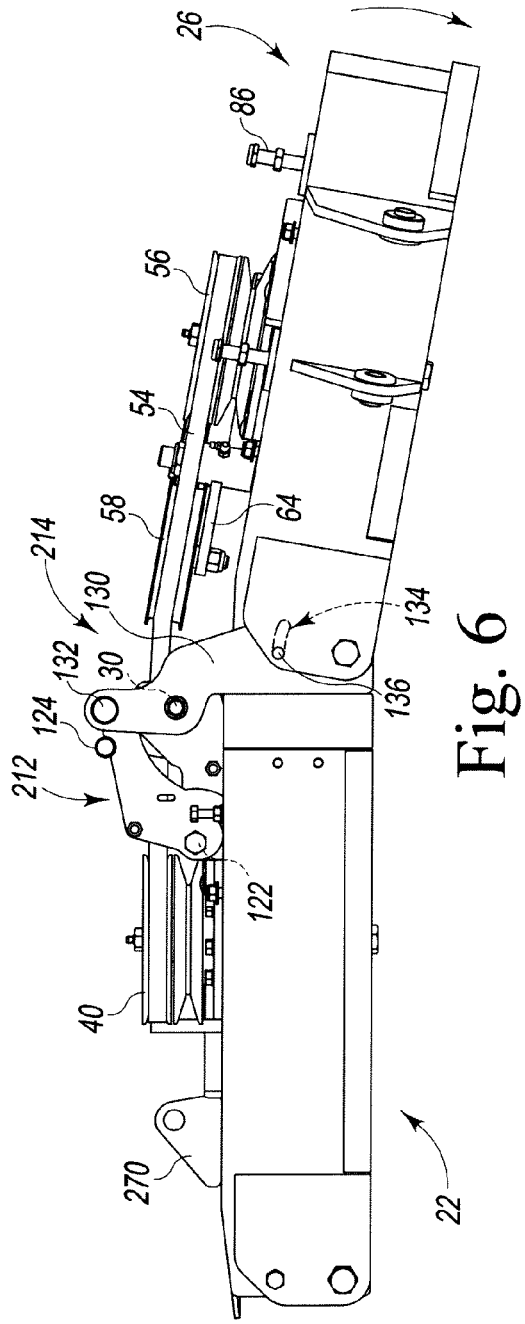

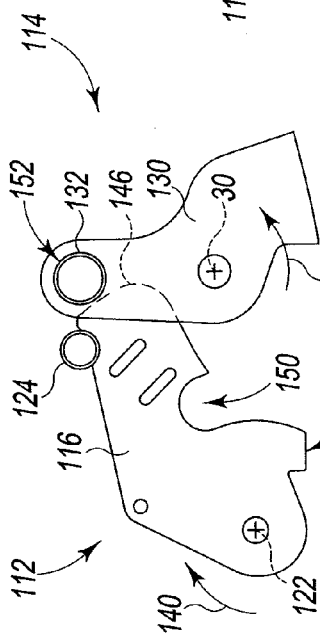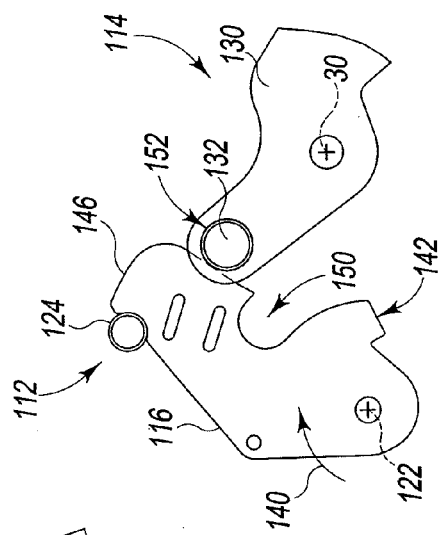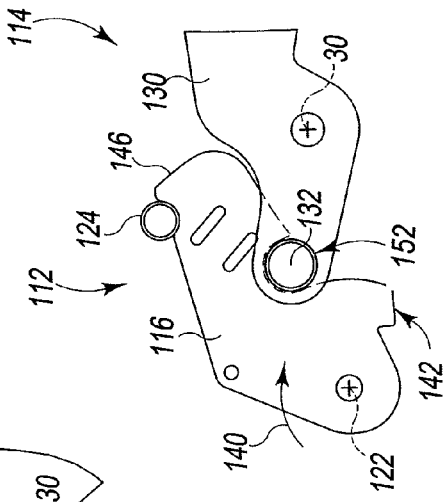

PIVOTING MOWER DECK

CROSS REFERENCE TO RELATED APPLICATIONS

This application is a continuation of U.S. patent application Ser. No. 12/119,409, filed May 12, 2008, the disclosure of which is hereby incorporated by reference.

BACKGROUND

The present disclosure is related to articulated mower decks. More specifically, the present disclosure is related to mowers with articulated deck sections which pivot between raised transport and a lowered use position and latch into chosen position.

Use of mower decks which employ rotary cutter blades is known in the art. Rotary cutter blades are driven such that the blades turn in a horizontal plane parallel to the surface of the ground to clip grass and other vegetation which grows from the ground. Mower decks which employ a single rotary cutter blade may be driven by a power transmitter powered by a prime mover, such as a tractor for example. The prime mover moves the mower deck over the ground and may provide power to the mower deck through the power transmitter. In some cases, the mower deck is independently powered.

The power transmitter may be a rotating shaft that engages a gearbox which rotates a central mower blade. The mower deck may include additional sections having additional mower blades outboard of the central mower. The outboard blades may be driven by rotating shafts which extend from the gearbox. In some cases, the outboard mower decks pivot relative to the central mower deck to a stowed position to narrow the width of the mower deck for transport. In some cases, articulated mower decks which pivot are powered by belts and pulleys which transmit power from a central pulley to the outboard decks, the belt turning a pulley on the outboard deck. Folding of the outboard mower decks may be accomplished by an actuator or in some cases may be accomplished by a user lifting the mower deck into the raised position.

When outboard mower decks pivot relative to a central mower deck, the outboard mower deck may be urged into a raised position during operation of the mower deck if the outboard portion encounters some discontinuity in the surface of the ground. If an outboard mower deck is powered by a belt and pulley system, movement of the outboard deck toward a raised position may cause the belts to disengage the pulleys of the outboard mower decks. This presents a potential for damage to the belts as the drive pulley will continue to act on the belt, thereby damaging the belt. In addition, during transport of the mower deck at a transport speed, the raised mower decks must be retained in position to prevent the deck from unexpectedly falling from the raised position. For example, outboard decks may be secured by cables or chains during transport.

SUMMARY

The present disclosure describes one or more of the features recited in the appended claims and/or the following features which, alone or in any combination, may comprise patentable subject matter:

A mower deck comprises a first deck section, a second deck section pivotably coupled to the first deck section and latch means for retaining the second deck section in one of a plurality of positions. The second deck section is movable between a lowered position and a raised position. In the lowered position, the second deck section is operable to cut grass and other vegetation. In the raised position the second deck section is raised for transport of the mower deck.

The latch means is configured for retaining the second deck section in the lowered position when the latch means is a first position. The latch means is also configured for retaining the second deck section in the raised position when the latch means is in a second position. The latch means is thereby configured to be movable to prevent the second deck section from unexpectedly raising from the lowered position and unexpectedly lowering from the raised position.

The latch means may include a first portion supported on the first deck section and movable relative thereto and a second portion support on the second deck section. The second portion of the latch means may be configured to be engaged by the first portion when the second deck section is in the lowered position. The second portion of the latch means may also be configured to be engaged by the first portion when the second deck section is in the raised position. The latch means may include a catch assembly coupled to the first deck section and a latch coupled to the second deck section, the latch being configured to be engaged by the catch assembly.

The catch assembly may include a catch plate pivotably coupled to the first deck section and a bias member coupled to the catch plate and the first deck section, the bias member configured to urge the catch assembly to engage the latch. The catch plate may include a first portion configured to engage the latch when the second deck section is in the lowered position such that forces transferred from the latch to the first portion urge to catch plate to engage a surface on the first deck section to thereby prevent pivoting of the second deck section. The catch plate may include a second portion configured to grasp the latch when the second deck section is in the raised position such that forces transferred from the latch to the second portion increased the retaining force of the catch assembly relative to the latch.

The mower deck may further include an actuator configured to move the second deck section between the raised and lowered positions. The actuator may act on the catch assembly to disengage the catch assembly from the latch such that the second deck section is free to move between a lowered and the raised position. In some embodiments, the actuator may be a double acting hydraulic cylinder.

The mower deck may further include a power transmitter to transmit power between the first and second deck section. The power transmitter may be configured to be under tension when the second deck section is in the raised position to thereby urge the second deck section to be retained in the raised position. In some embodiments, the mower deck may be a rotary mower having one or more blades which rotate in a horizontal plane about a vertical axis. Each deck section may include a separate cutter blade. In some embodiments the first deck section may include a first pulley and the second deck section may include a second pulley and a spring-biased idler. Power may be transmitted between the first and second pulley by a belt trained about the first and second pulleys. The spring-biased idler may maintain the belt in tension when the second deck section is in the raised position.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which:

FIGS. 5-6 are a front view similar to FIG. 4 showing the pivoting deck section in the lowered position and further showing a range of floating motion the pivoting deck section achieves during operation of the mower deck over uneven surfaces;

FIGS. 13-15 is a side view of the catch assembly and the latch of the latch assembly of the embodiment of FIGS. 9-12, figures depicting the interaction of the catch assembly and the latch in various positions.

DETAILED DESCRIPTION OF THE DRAWINGS

Figure 1:
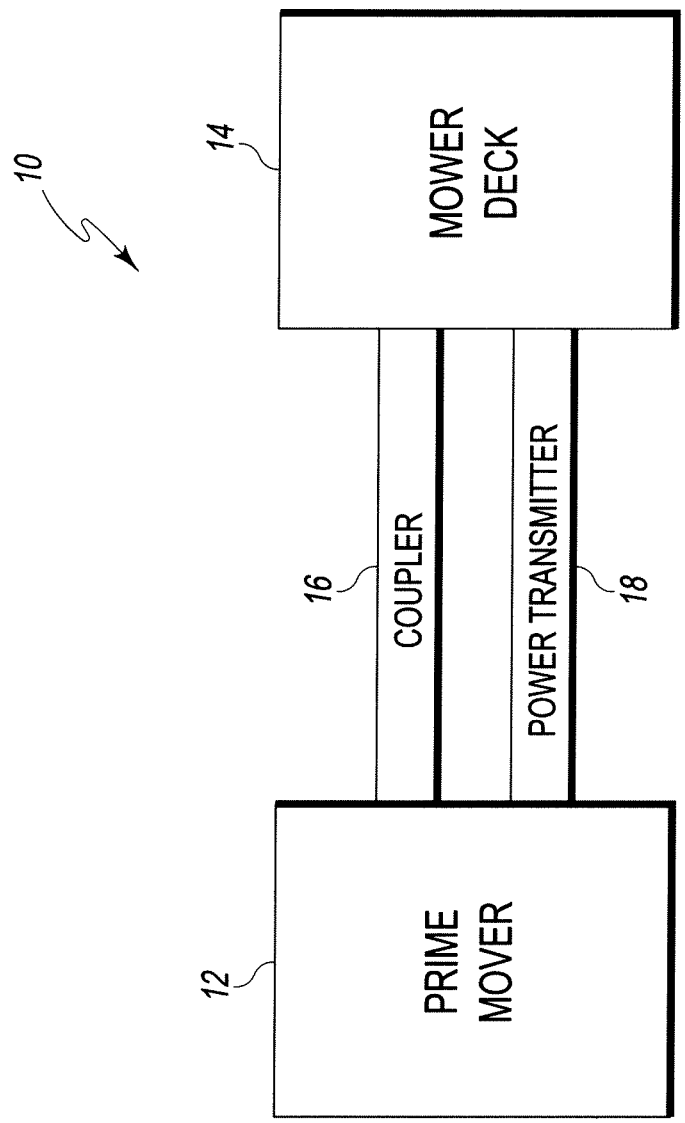
FIG. 1 is a diagrammatic view of a mower apparatus including a prime mover and a mower deck, the mower deck coupled to the prime mover through a coupler such that the prime mover controls movement of the mower deck and coupled to the prime mover through a power transmitter to receive power therefrom.

A mower apparatus 10 includes a prime mover 12 and a mower deck 14 coupled to the prime mover 12 as shown diagrammatically in FIG. 1. The mower deck 14 is coupled to the prime mover 12 through a coupler 16 such that the mower deck 14 moves with the prime mover 12 as the prime mover 12 moves along the ground. The mower deck 14 is also coupled to the prime mover 12 through a power transmitter 18 which transfers power from the prime mover 12 to the mower deck 14 to power the mower deck 14.

Figure 2:
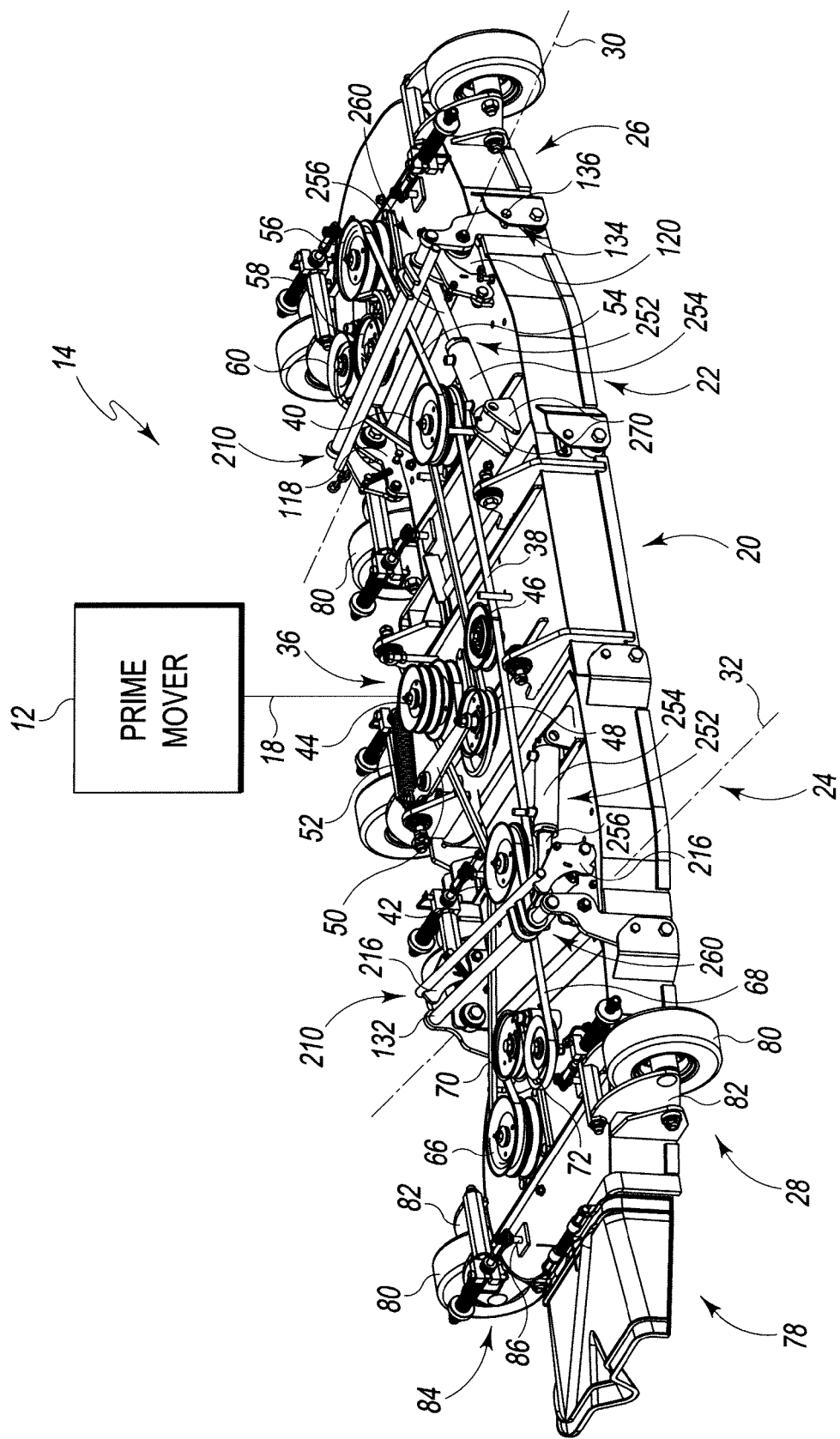
FIG. 2 is a perspective view of a mower deck including a first embodiment of a latch assembly for retaining a pivoting deck section in either a raised or lowered position relative to an adjacent deck section, the latch assembly including an actuator to raise and lower the pivoting deck section and engage or disengage the latch assembly.
Figure 3:
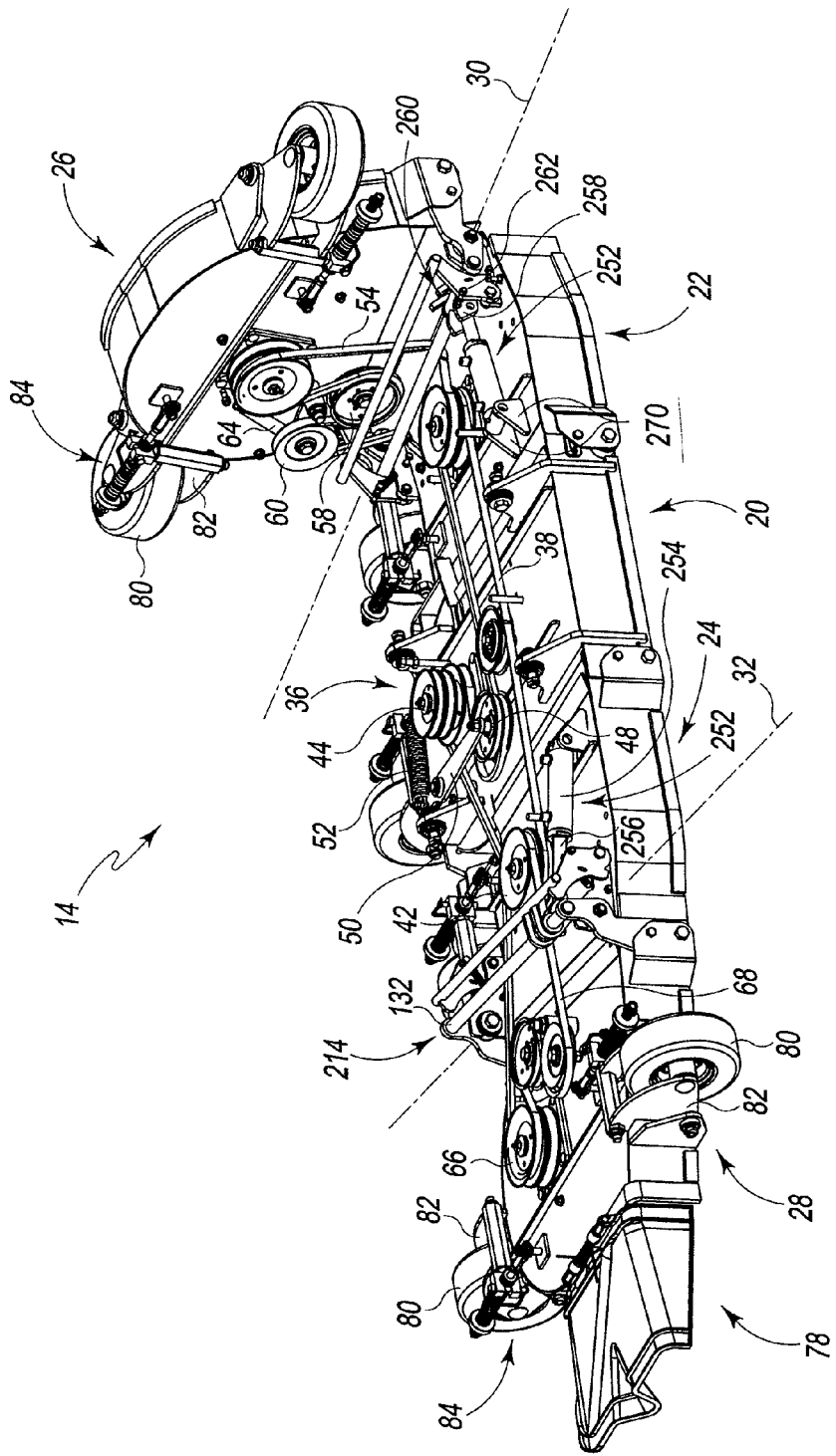
FIG. 3 is a perspective view of the embodiment of FIG. 2 with a pivoting deck section in a raised position suitable for transporting the mower deck.

Mower deck 14 includes a main deck section 20 and a pair of floating deck sections 22, 24 outboard of the main deck section 20 with each of the floating deck sections 22, 24 positioned on opposite sides of the main deck section 20 as shown in FIG. 2. Floating deck sections 22, 24 are pivotable relative to the main deck section 20. Mower deck 14 further includes a pivoting deck section 26 pivotably coupled to floating deck section 22 and a pivoting deck section 28 pivotably coupled to floating deck section 24. Pivoting deck section 26 pivots relative to floating deck section 22 about an axis 30 between a lowered position as shown in FIG. 2 and a raised position as shown in FIG. 3. Similarly, pivoting deck section 28 pivots about an axis 32 relative to floating deck section 24. Mower deck 14 includes a system of pulleys and belts through which power is transmitted from the prime mover 12 to rotary cutter blades under each of the deck sections 20, 22, 24, 26 and 28. Mower deck 14 further includes a power pulley 36 supported on main deck section 20 and rotatable relative thereto. Power is transmitted from prime mover 12 through power transmitter 18 to pulley 36 which is coupled to pulleys positioned on each of the deck sections 20, 22, 24, 26 and 28 so that rotation of power pulley 36 imparts rotation to each of the driven pulleys. Power transmitter 18 is a belt in the illustrative embodiment.

A first belt 38 is trained about a driven pulley 40 on floating deck section 22 and a driven pulley 42 on floating deck section 24. Power pulley 36 includes a shaft 44 which drives 80 rotary blade (not shown) within deck section 20 to cut grass. Rotation of power pulley 36 moves belt 38 about driven pulleys 40 and 42 to drive respective rotary cutter blades 49 under each of the deck sections 22 and 24. A guide pulley 46 cooperates with an idler 48 to maintain belt 38 trained on pulleys 36, 40, and 42. Guide pulley 46 is mounted on main deck section 20 and rotatable relative thereto. Idler 48 is rotatably coupled to an arm 50 which is pivotable relative to main deck 20 and held in tension by and extension spring 52 to thereby maintain belt 38 in contact with pulleys 36, 40 and 42. Power is transferred through pulley 40 to a driven pulley 56 on pivoting deck section 26 through a belt 54. Driven pulley 56 also drives a rotary cutter blade within pivoting deck section 26. Pivoting deck section 26 further includes a guide pulley 58 and an idler 60 which cooperate to maintain belt 54 in tension. Idler 60 is supported on an arm 62 which is pivotably coupled to pivoting deck section 26 and acted upon by a spring 64 to maintain belt 54 in tension.

Pivoting deck section 28 includes a driven pulley 66 which receives rotary motion from pulley 42 transferred through a belt 68 which is trained about pulley 42 and pulley 66. Pivoting deck section 28 further includes a guide pulley 70 and an idler 72 which cooperate to maintain belt 68 in tension. Idler 72 is mounted on an arm 74 and rotatable relative thereto. Arm 74 is pivotably coupled to pivoting deck section 28 and is further engaged with deck section 28 by an extension spring 76 which maintains belt 68 in tension by acting upon idler 72 through arm 74. Driven pulley 66 is coupled to a rotary cutter blade 49 within pivoting deck section 28. In addition, pivoting deck section 28 includes a discharge outlet 78 through which clips grass particles is does discharged when mower deck 14 operates. Mower deck 14 includes a plurality of wheels 80 which are rotatably mounted to wheel brackets 82 and rotatable relative thereto. Wheel brackets 82 are each pivotably coupled to a respective deck section 20, 22, 24, 26 and 28. In addition, each of the wheel brackets 82 is coupled to the deck section through a tensioning assembly 84 which acts as a combination height adjustment mechanism and shock absorber for each of the wheels 80.

Each tensioning assembly 84 is coupled to a respective deck section 20, 22, 24, 26 and 28 through a stud 86 which is coupled to a respective deck section. The tensioning assemblies 84 each include a threaded rod 88 with a ball-end 90 coupled to the rod 88 and engaged with the stud 86. Each wheel bracket 82 includes a retainer 92 which is configured to engage the threaded rod 88 such that the wheel bracket 82 is coupled to the threaded rod 88. The tensioning assembly includes a plurality of spring washers 94 which are captured on the threaded rod 88 between a washer 96 and retainer 92. A nut 98 is engaged with the threads 100 of threaded rod 88 such that the nut 98 acts on a washer 96 to compress spring washers 94 between washer 96 and retainer 92.

Figure 9:
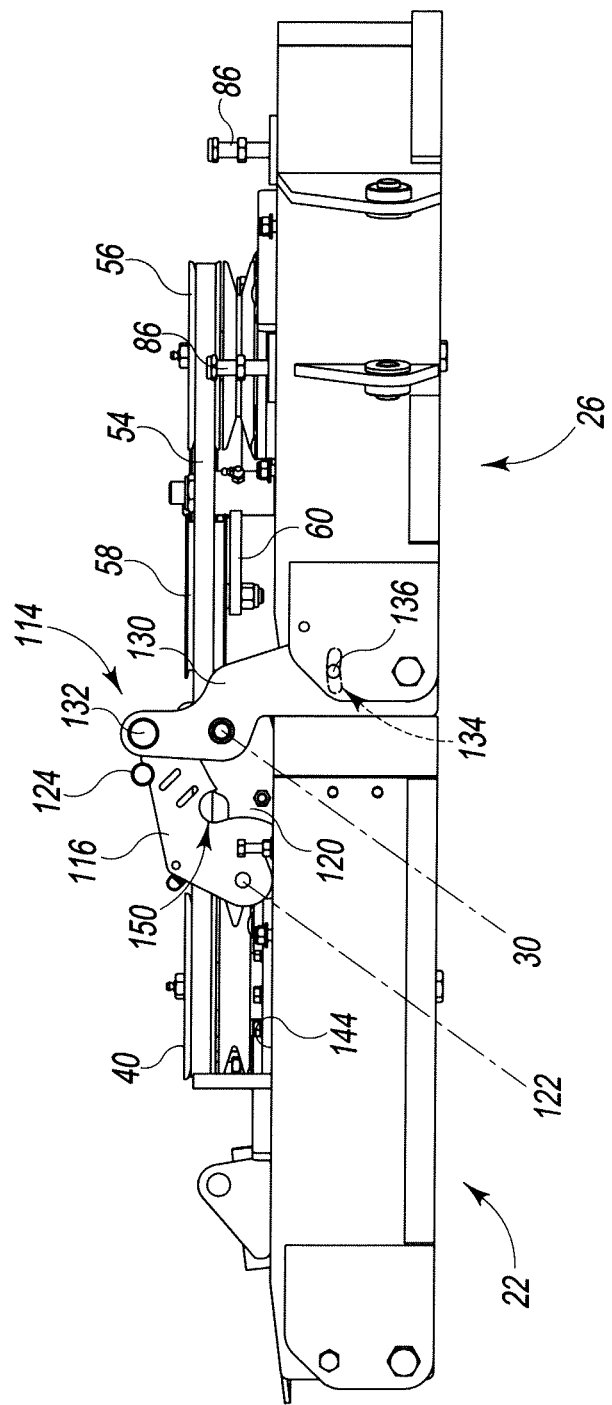
FIG. 9 is a front view of a portion of a mower deck similar to the mower deck of FIGS. 2-8, the embodiment of mower deck of FIG. 9 having the actuator omitted and employing a manual latch assembly positioned to maintain a pivoting deck section in a lowered position.
Figure 10:
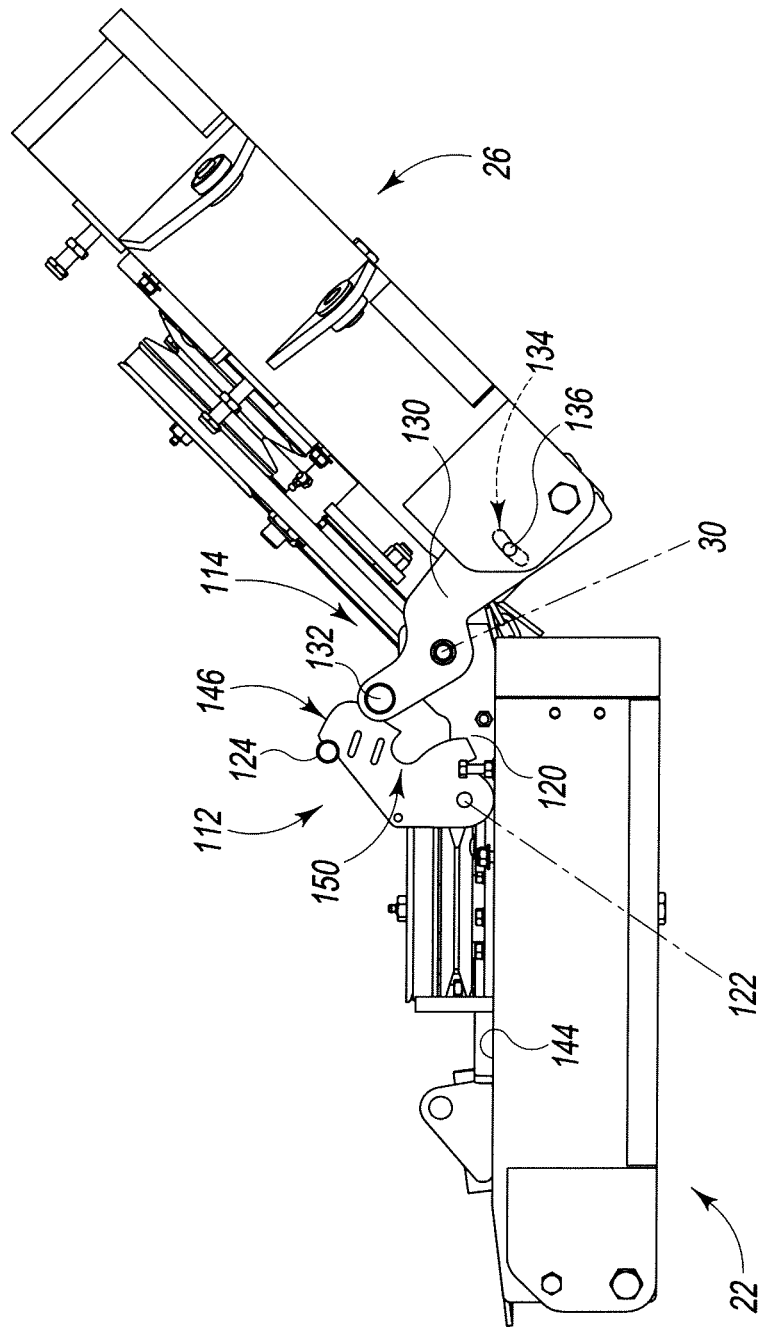
FIG. 10 is a front view similar to FIG. 9, a catch assembly of the latch assembly released and the pivoting deck section partially raised.
Figure 11:
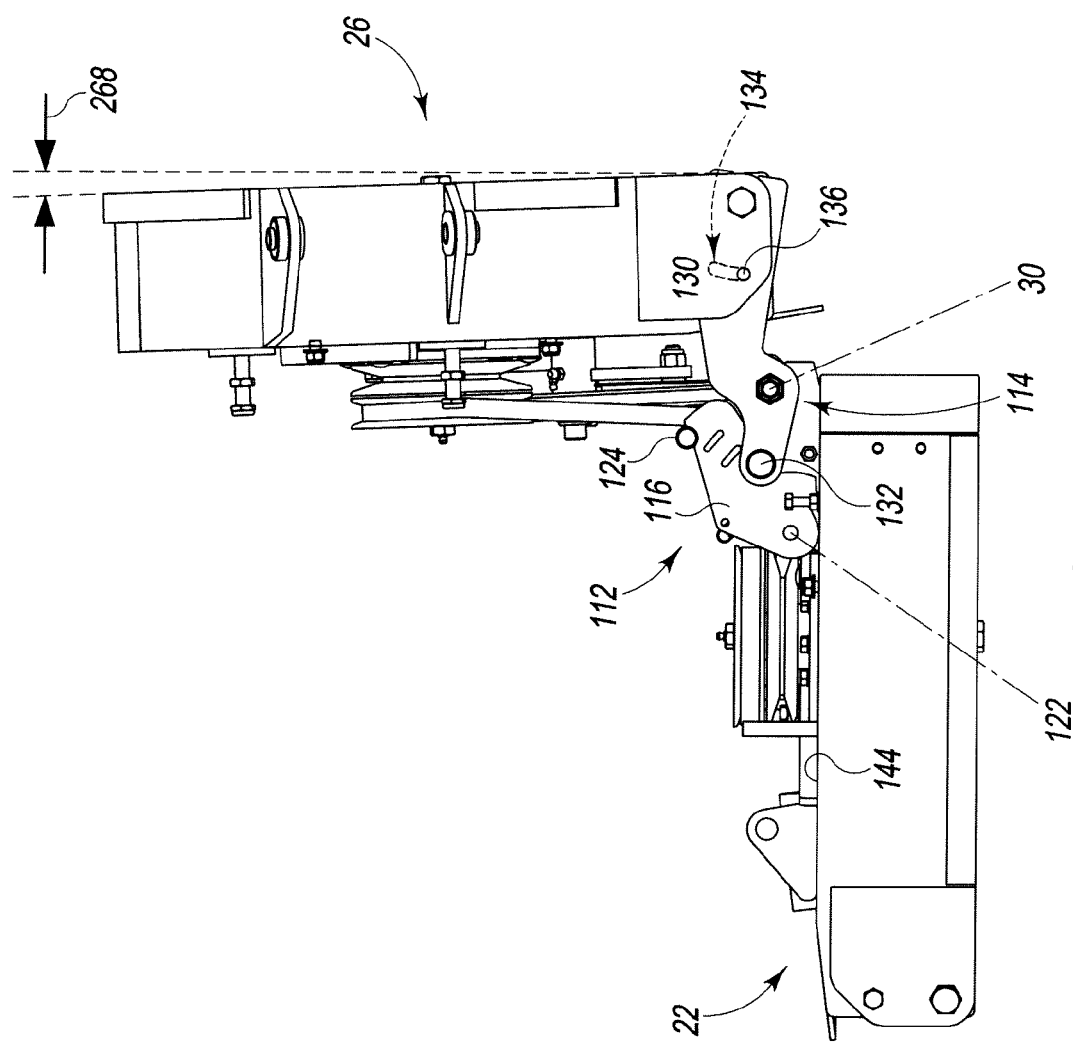
FIG. 11 is a front view similar to FIGS. 9-10, the pivoting deck section moved to a raised position wherein the pivoting deck section is in an over-center condition and wherein the catch assembly is engaged to maintain the deck in a raised position until released.
Figure 12:
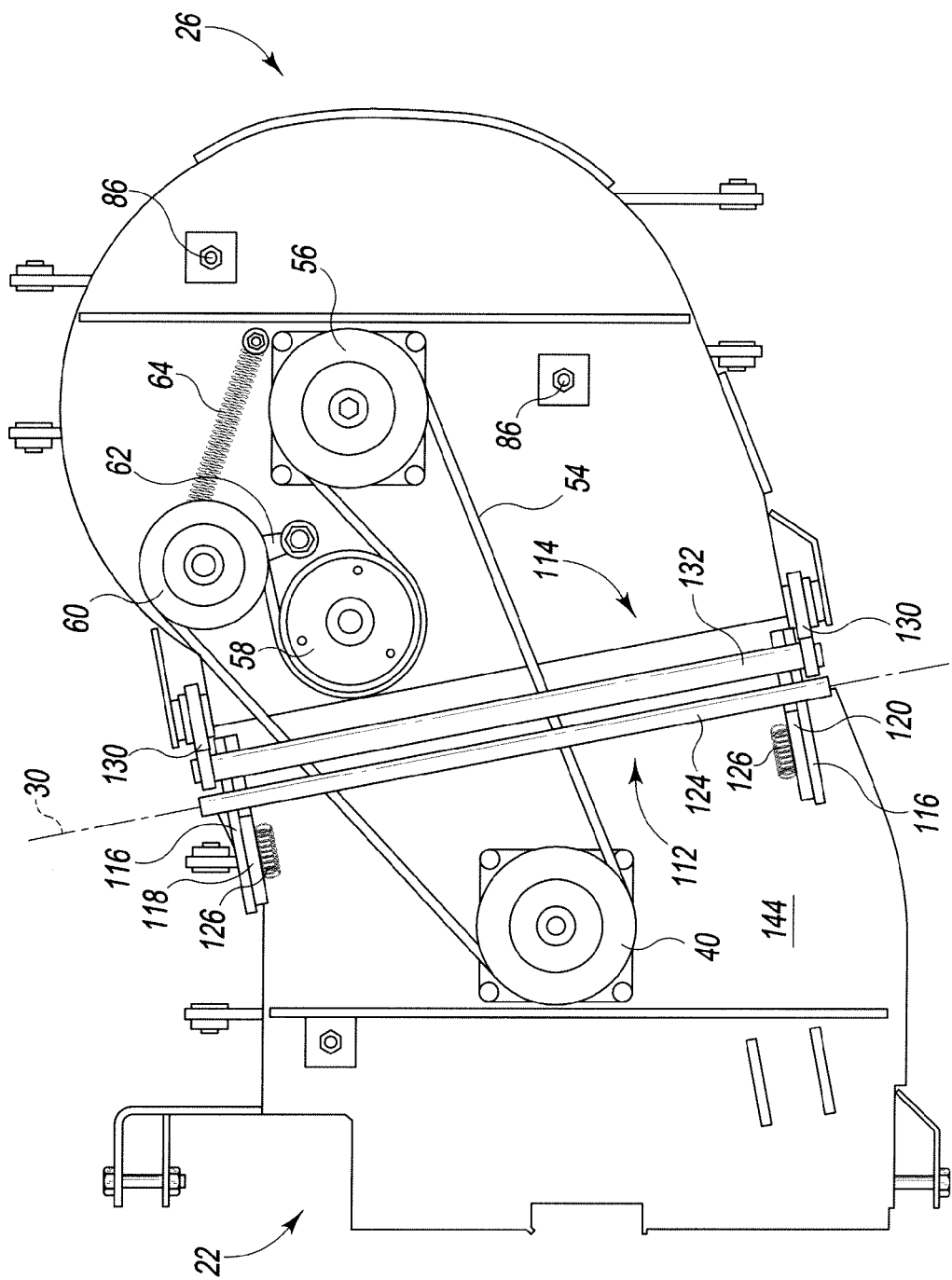
FIG. 12 is a top view of the embodiment of FIGS. 9-11, the pivoting deck section in a lowered position.

Referring now to FIGS. 9-16, an embodiment of mower deck 14 further includes a latch assembly 110 which is configured to retain pivoting deck section 26 in a raised position as shown in FIG. 11 during transport of mower deck 14. A second latch assembly 110 is positioned to maintain pivoting deck section 28 in a raised position relative to floating deck section 24. In the following discussion, the operation of the latch assembly 110 will be explained in relationship to pivoting deck section 26 and floating deck section 22. It should be understood that the operation of the latch assembly 110 with respect to floating deck section 24 and pivoting deck section 28 is similar to the operation of the latch assembly 110 between pivoting deck section 26 and floating deck section 22.

Latch assembly 110 includes a catch assembly 112 and a latch 114. As will be described in further detail, catch assembly 112 is movable relative to deck section 22 such that catch assembly 112 engages latch 114 when pivoting deck section 26 is in the lowered position to prevent pivoting deck section 26 from pivoting about axis 30. When pivoting deck section 26 is to be raised catch assembly 112 can be pivoted relative to deck section 22 to allow pivoting deck section 26 to rotate about axis 30 to a raised position whereby catch assembly 112 engages latch 114 to retain pivoting deck section 26 in a raised position.

Catch assembly 112 comprises a pair of catch plates 116 which are each pivotably coupled to respective flanges 118 and 120 of floating deck section 22 and pivotable about a common axis 122. Handle 124 is coupled to each of the catch plates 116 to interconnect the catch plates 116. Catch assembly 112 further includes a pair of extension springs 126, with each spring coupled to a respective flange 118, 120 and a respective catch plate 116. Springs 126 bias catch assembly 112 and resist movement of catch assembly 112 about axis 122 in the direction of arrow 128.

Latch 114 comprises a pair of pivot arms 130 coupled to pivoting deck section 26 and pivotable with pivoting deck section 26 about axis 30. The latch 114 further includes a latch bar 132 which is coupled to each of the pivot arms 130, the latch bar 132 being engaged by the catch plates 116 to limit movement of pivoting deck section 26 about axis 30. It should be understood that while latch assembly 110 limits movement of pivoting deck section 26 about axis 30, pivoting deck section 26 is configured to float relative to floating deck section 22 when latch bar 132 is engaged with catch plates 116. Pivot arms 130 are formed to include a guide 134 which receives a stop 136 coupled to a flange 138 of pivoting deck section 26. As pivoting deck section 26 floats relative to floating deck section 22, stop 136 moves within guide 134 to allow floating deck section 22 a range of movement of about 15° relative to floating deck section 22. While not described in detail here, floating deck section 22 floats relative to main deck section 20 in a similar manner. Thus, pivoting deck sections 26 and 28 and floating deck sections 22 and 24 pivot relative to one another to allow mower deck 14 to conform to uneven ground and thereby maintain a uniform cut height for the grass being cut. It should be understood that the action of idlers 48, 60, and 72 maintains belts 38, 54, and 68 in tension as deck sections 22, 24, 26 and 28 pivot to assure that all of the rotary cutting blades 49 receive power as the deck 14 moves over the ground.

Figure 16:
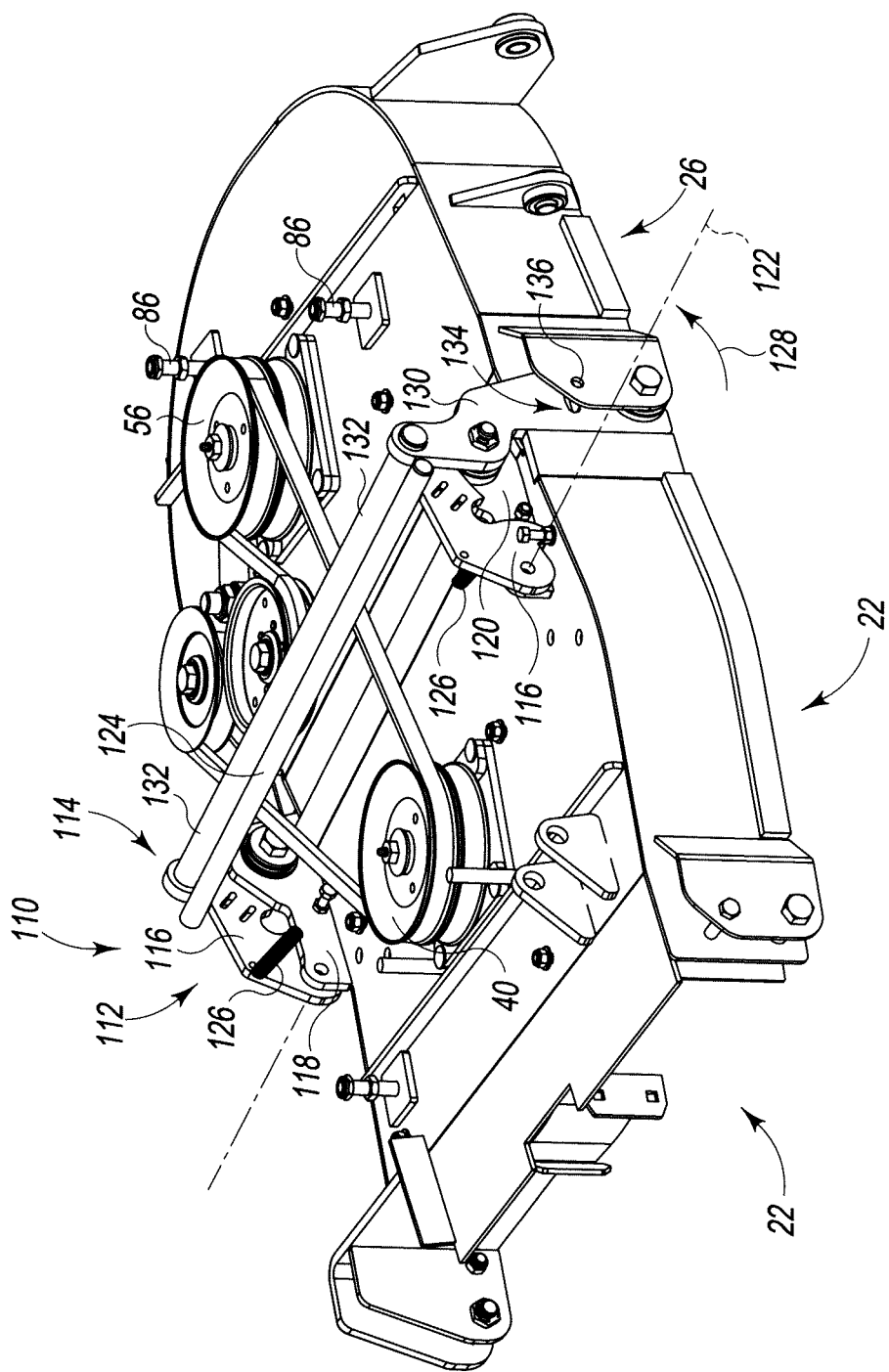
FIG. 16 is a perspective view of the embodiment of FIGS. 9-15 taken from a front end of the mower deck.

The interaction of catch plates 116 and latch bar 132 is depicted in FIGS. 9-11. The springs 126 are not shown in FIGS. 13-15, but it should be understood that catch assembly 112 is urged to rotate about axis 122 by spring 126 in the direction of arrow 140. Catch plate 116 is formed to include a stop surface 142 which engages the upper surface 144 of floating deck section 22 such that rotation of catch assembly 112 about axis 122 in the direction of arrow 140 is limited by the interaction of stop 142 and surface 144. In that position, catch plate 116 engages latch bar 132 as shown in FIG. 16. Specifically, a surface 146 of catch plate 116 engages an outer surface 152 of latch bar 132 to limit the movement of latch 114 about axis 30 in the direction of arrow 148. Latch 114 is free to move about axis 130 in the direction opposite of arrow 148 some minimal distance.

When catch assembly 112 is pivoted about axis 122 in the direction opposite of arrow 140, surface 146 disengages from latch bar 132 such that latch 114 and pivoting deck section 26 is permitted to pivot about axis 30 in the direction of arrow 148. For example, catch assembly 112 is shown in a raised position in FIG. 10. Latch 114 is pivoted about axis 30 to an intermediate position whereby latch bar 132 acts against surface 146 to urge catch assembly 112 to pivot about axis 122. Catch assembly 112 is disengaged from latch one or 114 by a user who grips handle 124 and lifts catch assembly 112 causing it to pivot about axis 122. In the position shown in FIG. 16, a user may grip pivoting deck section 26 and lift pivoting deck section 26, causing it to pivot about axis 30 as latch bar 132 acts on surface 146 to cause catch assembly 112 to pivot about axis 122.

When pivoting deck section 26 is pivoted to a fully raised position latch bar 132 is received in a catch 150 formed in catch plates 116. As shown in FIG. 11, catch 150 is formed to receive latch bar 132 and catch assembly 112 is biased downwardly to retain latch 114 and thereby pivoting deck section 26 in the raised position. Because catch assembly 112 is spring-biased, if pivoting deck section 26 bounces during transport causing pivoting deck section 26 to pivot further about axis 30 in the direction of arrow 148, catch assembly 112 will maintain engagement with a latch 114.

In the illustrative embodiments of FIGS. 2-9, latch assembly 110 is omitted and replaced with a latch assembly 210 which includes a catch assembly 212, a latch 214, and a lifter 250. Catch assembly 212 is configured similarly to catch assembly 112 and includes a pair of catch plates 216 pivotably coupled to flanges 118 and 120 of floating deck section 22. Catch assembly 212 further includes handle 124 interconnecting catch plates 216, 216. An extension spring 126 is coupled to each catch plate 216 and a respective flange 118 and 120 in a manner similar to catch assembly 112. Latch assembly 210 is configured to allow a user to automatically raise pivoting deck section 26 through the activation of an actuator 252. Actuator 252 includes a cylinder 254 and a rod 256 which extends and retracts relative to cylinder 254. Cylinder 254 is pivotably coupled to floating deck section 22 through a pair of flanges 270. Actuator 252 is embodied as a double-acting hydraulic cylinder in the illustrative embodiment.

Figure 4:
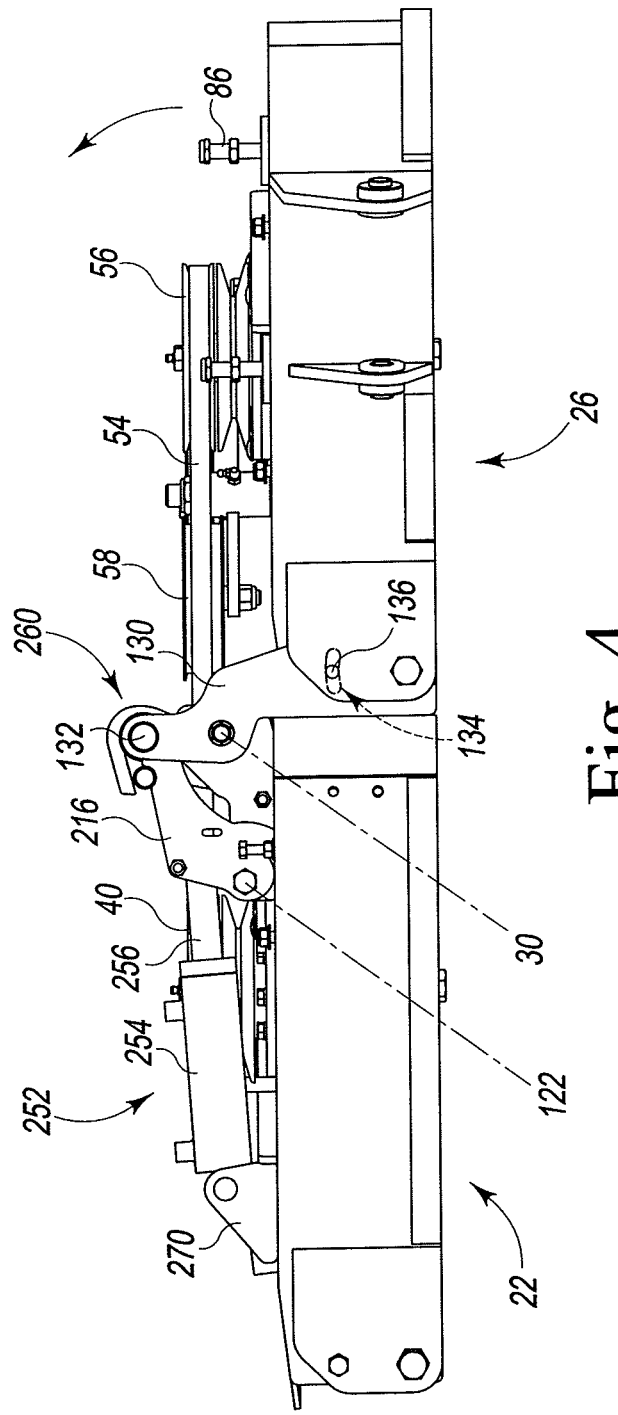
FIG. 4 is a front view of a portion of the mower deck of FIGS. 2 and 3 with portions removed.
Figure 7:
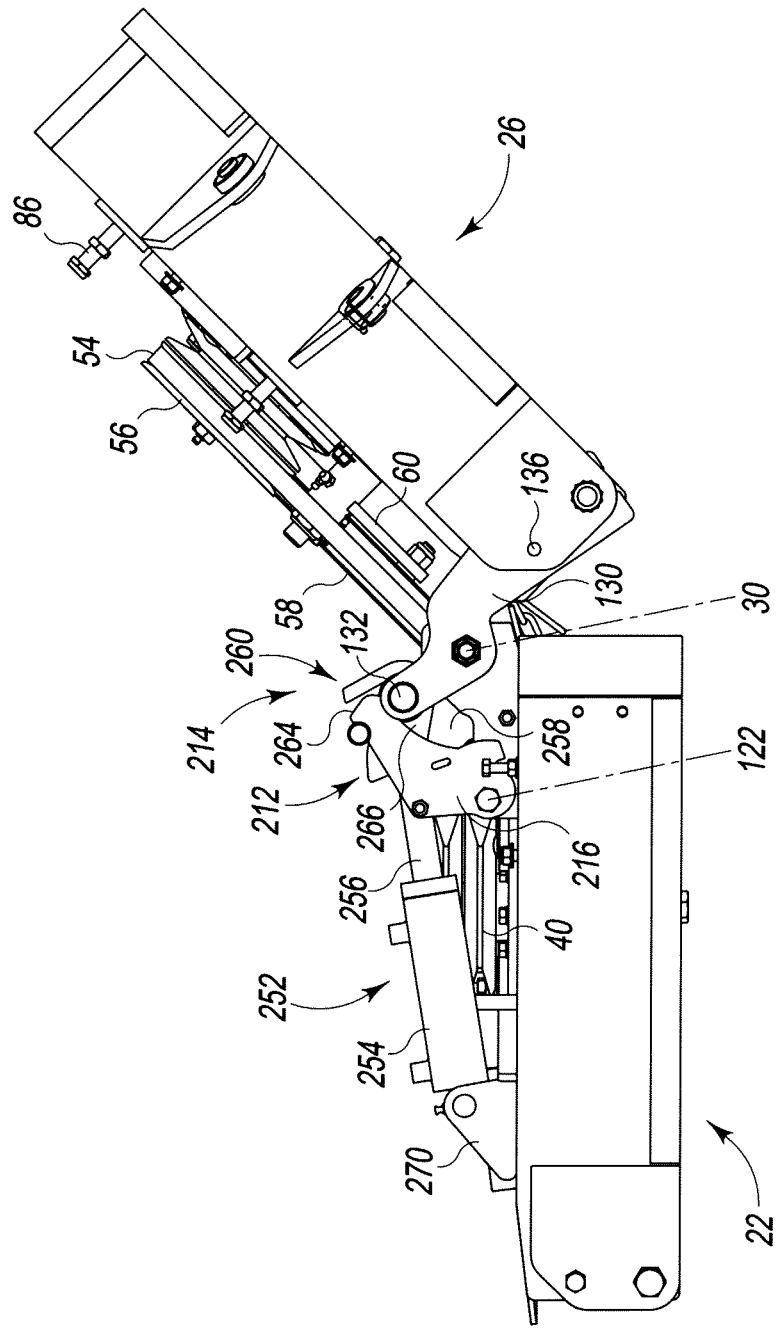
FIG. 7 is a front view similar to FIG. 4 showing the pivoting deck section in a partially raised position.
Figure 8:
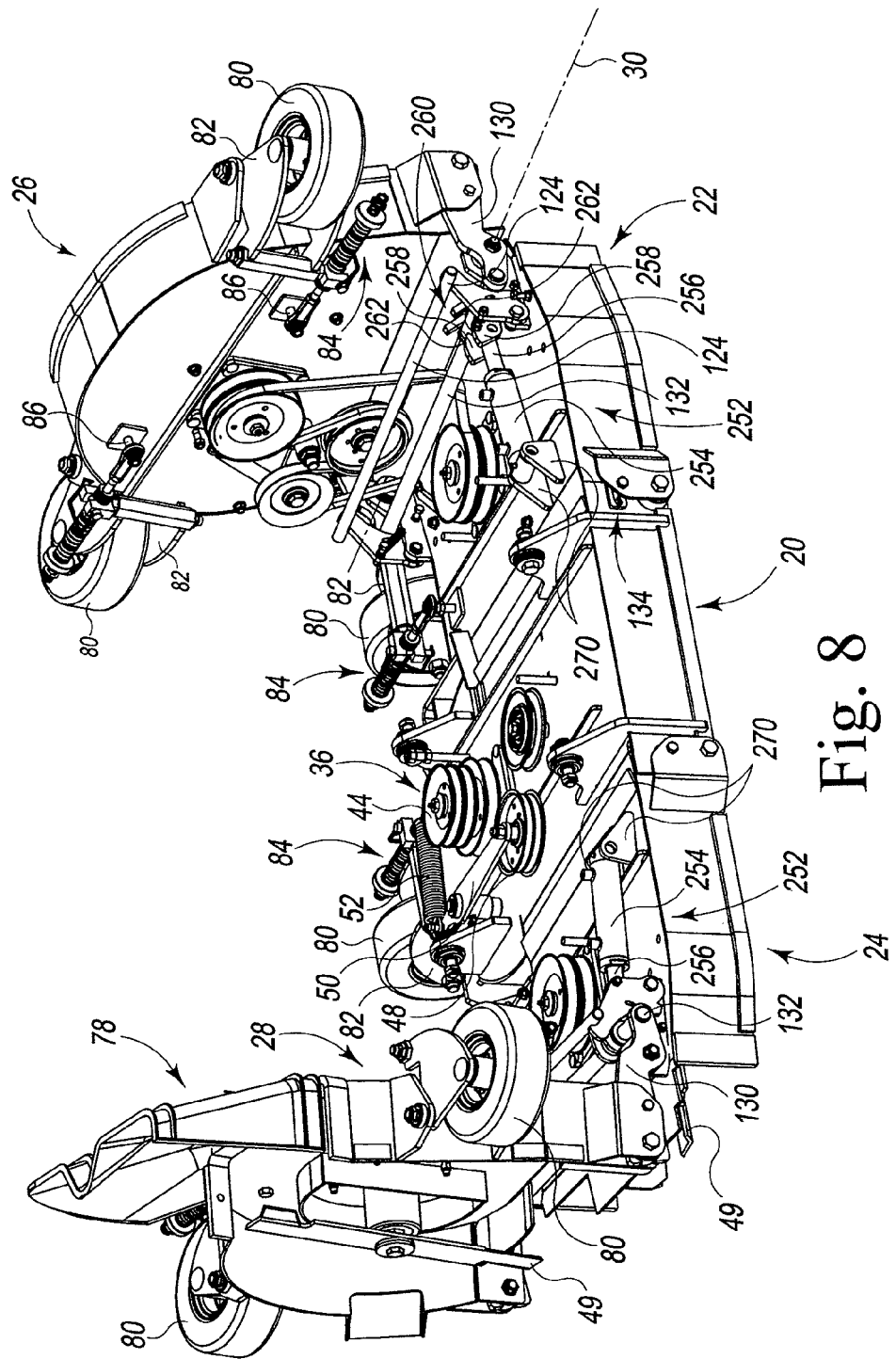
FIG. 8 is a view similar to FIGS. 2 and 3, wherein the outboard pivoting deck sections of the mower deck are pivoted to a raised position.

Referring now to FIG. 4, when pivoting deck section 26 is in a lowered position, catch plates 216 engage latch bar 132 to prevent rotation of pivot arms 130 and thereby pivoting deck section 26 about axis 30. Actuator 252 further includes a gripper 260 coupled to rod 256 and configured to engage latch bar 132. Gripper 260 includes a pair of flanges 258 formed to include hooks into which latch bar 132 is received. Latch bar 132 pivots relative to gripper 260 as rod 256 is extended and retracted. Flanges 258 are further formed to include a cam surface 262 which acts on handle 124 of catch assembly 212 to disengage the catch plates 216 from the latch bar 132 as rod 256 is retracted. Referring now to FIG. 7, rod 256 of actuator 252 is shown retracted a sufficient distance to cause a surface 264 of catch plates 216 to disengage latch bar 132. As rod 256 retracts, latch bar 132 acts on a cam surface 266 of catch plate 216 to cause catch assembly 212 to rotate about axis 122. In the raised position as shown in FIG. 3, catch assembly 212 rests against latch bar 132, but actuator 252 retains pivoting deck section 26 in the raised position and catch plates 216 do not influence the position of pivoting deck section 26.

In either embodiment of mower deck 14, it is important to note that when the pivoting deck section 26 is in a raised position, the deck section 26 achieves a slightly over-center position as depicted by the arrow 268 in FIG. 11. The over-center condition is achieved due to the movement of stop 136 in guide 134 of pivot arm 130. Spring 64 acts on idler 60 to maintain tension in belt 54. Movement of pivoting deck section 26 downwardly about axis 30 from the raised position to the lowered position requires deflection of spring 64. As shown in FIG. 11 and in FIG. 3, latch bar 132 is engaged by belt 54 when pivoting deck section 26 is in the raised position. The action of spring 64 on belt 54 assists in maintaining pivoting deck section 26 in the raised position as spring 64 is preloaded and lowering of deck section 26 requires sufficient force to overcome preloaded spring 64. Thus, as mower deck 14 is transported, any vibration or bouncing that may be experienced is dampened by the action of spring 64 and belt 54 to reduce the potential of pivoting deck section 26 from inadvertently pivoting downwardly. In this way, catch assembly 112 or actuator 252 is assisted in maintaining pivoting deck section 26 in the raised position by the action of belt 54 and spring 64. In addition, the action of spring 64 on arm 62 maintains belt 54 in position on the pulleys 40, 56, and 58.

In both embodiments, whether employing latch assembly 110 or latch assembly 210, the movement of pivoting deck section 26 relative to floating deck section 22 is similar. Likewise, the interaction between pivoting deck section 28 and floating deck section 24 functions in a similar manner.

Although certain illustrative embodiments have been described in detail above, variations and modifications exist within the scope and spirit of this disclosure as described and as defined in the following claims.

The invention claimed is:

1. A mower deck comprising,
a first deck section including a rotary blade,
a pivot arm pivotably coupled to the first deck section and pivotable relative to the first deck section about a first axis, the pivot arm movable relative to the first deck section between a lowered and a raised position, and
a second deck section pivotably coupled to the pivot arm and movable with the pivot arm between the lowered position and the raised position, the second deck section including a rotary blade, wherein the second deck engages the pivot arm such that the range of movement of the second deck section relative to the pivot arm is limited,
wherein the pivot arm includes a guide which limits movement of the second deck section relative to the pivot arm, and
wherein the second deck section includes a follower that engages the guide at first and second limits.

2. The mower deck of claim 1, wherein the first deck section includes a first pulley and a bar, and wherein the second deck section includes a second pulley and a spring-biased idler, and wherein the mower deck includes a belt that engages the first and second pulleys, the idler, and the bar such that when the second deck section is in the raised position, the bias of the idler maintains the belt in tension.

3. A mower deck comprising,
a first deck section,
a pivot arm pivotably coupled to the first deck section and pivotable relative to the first deck section about a first axis, the pivot arm movable relative to the first deck section between a use position and a transport position,
a second deck section pivotably coupled to the pivot arm about a second axis and movable with the pivot arm between the use position and transport position and pivotable relative to the pivot arm about the second axis such that the second deck section pivots relative to the first deck section without movement of the pivot arm relative to the first deck section in the use position, and
a power transmitter to transmit power between the first and second deck sections,
wherein the mower deck further comprises a tensioner operable to tension the power transmitter such that a first tension force is applied to the power transmitter when the second deck section is in the lowered position and a second tension force is applied to the power transmitter when the second deck section is in the transport position to urge the second deck section to be retained in the transport position.

4. The mower deck of claim 3, wherein the pivot arm includes a guide which limits movement of the second deck section relative to the pivot arm.

5. The mower deck of claim 4, wherein the second deck section includes a follower that moves in the guide such that the guide limits the pivoting of the second deck section relative to the pivot arm to be between a first limit and a second limit.

6. A mower deck comprising,
a first deck section,
a pivot arm pivotably coupled to the first deck section and pivotable relative to the first deck section about a first axis, the pivot arm movable relative to the first deck section between a lowered and a raised position,
a second deck section pivotably coupled to the pivot arm about a second axis and movable with the pivot arm between the lowered and raised positions and pivotable relative to the pivot arm about the second axis such that the second deck section pivots relative to the first deck section without movement of the pivot arm relative to the first deck section, and
a power transmitter to transmit power between the first and second deck sections,
wherein the pivot arm includes a guide and the second deck section includes a follower that moves in the guide such that the guide limits the pivoting of the second deck section relative to the pivot arm to be between a first limit and a second limit.

7. The mower deck of claim 6, wherein the first deck section includes a first pulley and a bar, and wherein the second deck section includes a second pulley and a spring-biased idler, and wherein the mower deck includes a belt that engages the first and second pulleys, the idler, and the bar such that when the second deck section is in the raised position, the bias of the idler maintains the belt in tension.

8. A mower deck comprising,
a first deck section,
a pivot arm pivotably coupled to the first deck section and pivotable relative to the first deck section about a first axis, the pivot arm movable relative to the first deck section between a lowered and a raised position, a second deck section pivotably coupled to the pivot arm about a second axis and movable with the pivot arm between the lowered and raised positions and pivotable relative to the pivot arm about the second axis such that the second deck section pivots relative to the first deck section without movement of the pivot arm relative to the first deck section, a power transmitter to transmit power between the first and second deck sections, and motion limiting assembly including a guide and a follower, the follower moving in the guide to limit movement of the second deck section relative to the first deck section.

9. The mower deck of claim 8, wherein the first deck section includes a first pulley and a bar, and wherein the second deck section includes a second pulley and a spring-biased idler, and wherein the mower deck includes a belt that engages the first and second pulleys, the idler, and the bar such that when the second deck section is in the raised position, the bias of the idler maintains the belt in tension.

10. The mower deck of claim 8, wherein the mower deck further comprises a tensioner operable to tension the power transmitter such that a first tension force is applied to the power transmitter when the second deck section is in the lowered position and a second tension force is applied to the power transmitter when the second deck section is in the raised position to urge the second deck section to be retained in the raised position.

\* \* \* \* \*